United States Patent [19]

Offer

[11] Patent Number: 5,793,009
[45] Date of Patent: Aug. 11, 1998

[54] APPARATUS FOR JOINING METAL COMPONENTS USING BROAD, THIN FILLER NOZZLE

[75] Inventor: Henry Peter Offer, Los Gatos, Calif.

[73] Assignee: General Electric Company, San Jose, Calif.

[21] Appl. No.: 667,053

[22] Filed: Jun. 20, 1996

[51] Int. Cl.[6] .................................................. B23K 9/167
[52] U.S. Cl. ............................ 219/75; 219/74; 219/136
[58] Field of Search ............................... 219/136, 137.7, 219/74, 75; 228/33

[56] References Cited

U.S. PATENT DOCUMENTS

| 3,826,888 | 7/1974 | Garfield et al. | 219/136 |
|---|---|---|---|
| 4,110,590 | 8/1978 | Batey et al. | 219/75 |
| 4,270,037 | 5/1981 | Grinin et al. | 219/75 |
| 4,617,444 | 10/1986 | Engelhard et al. | 219/136 |
| 5,373,139 | 12/1994 | Burgoon et al. | 219/136 |

FOREIGN PATENT DOCUMENTS 58-181472  10/1983  Japan ........................ 219/75

*Primary Examiner*—Clifford C. Shaw
*Attorney, Agent, or Firm*—James E. McGinness; Dennis M. Flaherty

[57] ABSTRACT

A filler material guide nozzle assembly for feeding fusible filler metal wire or other metal forms into reduced-width, high-aspect-ratio (ratio of depth to width) metallic joints with control and stability of the filler metal position as it enters the molten pool area. The filler material guide nozzle assembly is designed with a thin but stiff non-circular cross-sectional shape, with its width dimension significantly greater than its thickness dimension, and can be utilized in very reduced-width welded or otherwise fused joints to provide the accuracy and stability required for reliable filler material addition. During use with welding, brazing and similar processes, the outlet end of the nozzle is located within the joint near the bottom, close to the area to be fused. The width dimension of the nozzle apparatus is oriented parallel to the depth of the weld joint, and the thickness dimension is oriented perpendicular to the depth of the joint. The thickness of the nozzle apparatus is less than the thickness of the joint between the components to be fused with the filler metal, allowing the outlet end of the nozzle to be fitted within the joint and in closer proximity to the molten pool during the joining process.

21 Claims, 12 Drawing Sheets

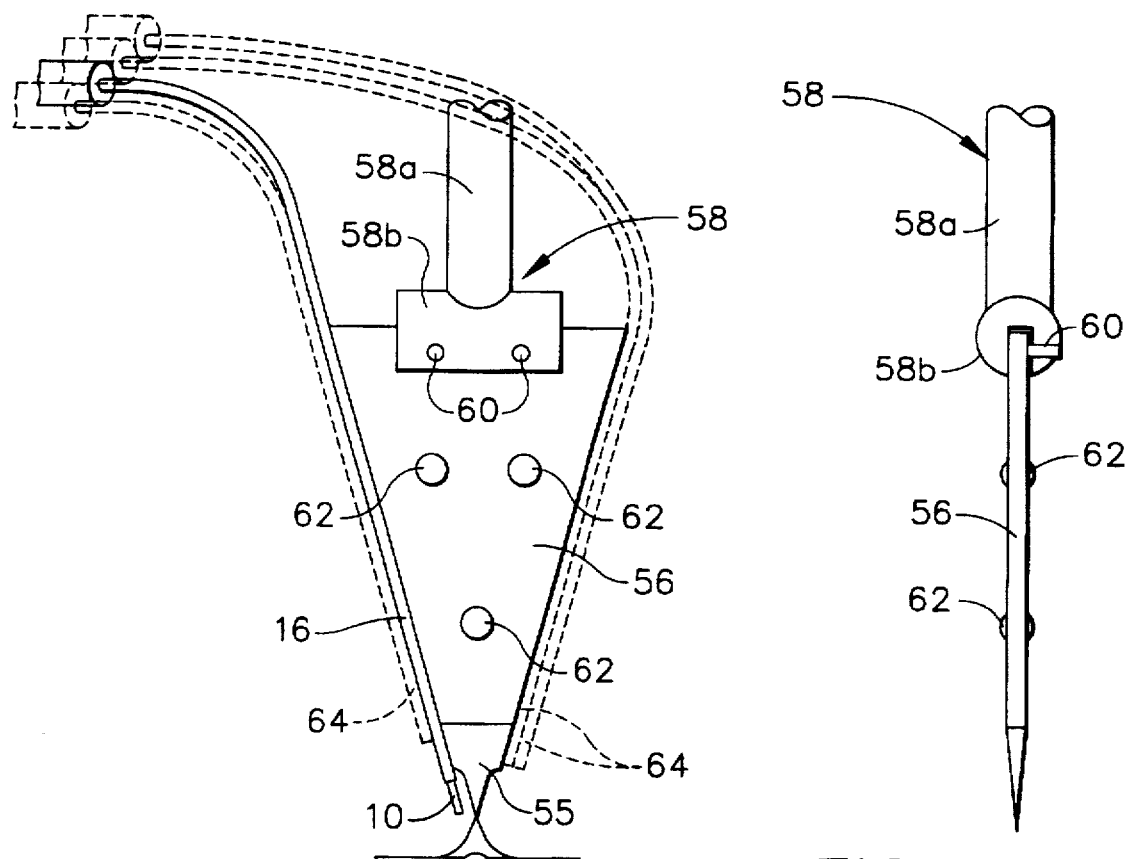
FIG. 12A
FIG. 12B
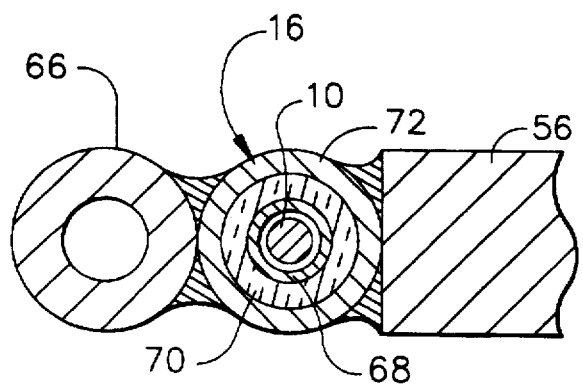
FIG. 12C

APPARATUS FOR JOINING METAL COMPONENTS USING BROAD, THIN FILLER NOZZLE

FIELD OF THE INVENTION

This invention relates to the automated welding of metal components. In particular, the invention relates to automated welding in a groove of small width using a flat welding electrode.

BACKGROUND OF THE INVENTION

Stress corrosion cracking (SCC) has led to the critical need for repair or replacement of many components and piping in boiling water reactors throughout the world. Welded joints have historically been the areas most likely to fail due to SCC because of their typically high values of tensile residual stress and their high degree of thermal sensitization in the HAZ. One solution to this problem is to replace components with new material having improvements in chemical composition. Due to the exceedingly high cost of replacing some components, the replacement must be durable. Replacements are generally an installation of newer SCC-resistant material joined to older, SCC-susceptible material, so it is highly desirable even for these cases that the joining process improve the residual stress and microstructural conditions in the older material, since the relatively low thermal efficiency, and the resultant effect of overheating, of conventional joining practices has often been one of the direct causes of the old component's failure.

Thus, there is a need for a mechanized welding process which will produce weld joints having very significantly improved SCC resistance. This can be accomplished using joint designs with deep but very narrow groove widths to minimize the amount of heat put into the weld material, thereby reducing the tensile residual stresses in the vicinity of the weld joint. Another benefit is an improvement in the SCC resistance of the microstructure of the heat affected zones (HAZ) adjacent to the weld.

In addition, there is a need for a welding method which decreases the welding time, and the corresponding man-rem personnel radiation exposure and production costs, associated with work on a "critical path" of an operating nuclear power plant. Conventional welding practices, including those used for field work, have relatively low overall thermal efficiency since a large portion of the heat goes into melting the required large volume of filler wire, rather than into fusing the walls of the joint together. This condition is a direct result of the unnecessarily wide joints used. In contrast, the use of very narrow welding grooves improves productivity due to the higher thermal and volumetric efficiencies of this new method, resulting primarily from the reduced heat input parameters and the reduced-width joint design, respectively.

An approach used in the welding industry to complete narrow groove joints on thicker material when the electrode and/or filler wire stickout beyond its means of support becomes excessive is to make the weld torch assembly as thin as practical, to fit within the joint and to be able to reach near or to the bottom, and then to make the joint width as narrow as possible consistent with this reduced internal torch width. Use of this style of internal torch still results in such a wide joint that other techniques must be resorted to in order to make the filler metal pool wet both sidewalls alternately, such as electrode tip lateral oscillation or magnetic arc lateral oscillation, or use of two or more passes per layer.

The approach of thinning the torch to fit within the joint (and in some cases thinning the viewing device as well) has the severe disadvantage of being limited in the amount of joint width reduction possible according to the reduced size of the torch, which typically includes provisions for an electrode holder, a weld gas cup/nozzle, a wire feed guide nozzle (for non-consumable electrode processes), water cooling flow circuits as required, and sometimes viewing camera optical components as well when used with remotely applied processes. The net result is a joint width which is considerably greater than desired to obtain a minimum weld width and therefore minimum weld volume which can be soundly completed with a minimum of heat input. Achieving these minimum values provides the correspondingly lower tensile residual stresses, reduced heat affected zone size and severity, and shorter filler material deposition time.

Conventional filler nozzles are subject to undesirable deflections. These deflections may be elastic or plastic (permanent), and can occur from wire with excessive "cast" (helical shape due to being wound on a circular spool) or from contact with the walls of the joint, manual handling of the welding or brazing equipment, etc. The commonly used larger-diameter circular-cross section nozzles, while being strong enough to successfully resist unacceptable deflections, either limit the view into the weld joint, or are too wide to easily fit into or be manipulated as required within very reduced-width joints, or both. The view is typically limited by a large-diameter nozzle since the viewing position is from above the nozzle and the viewing angle to the work surface is high (e.g., 45° to 75°), in order to maintain the preferred low wire entry angle (e.g. 15° to 45°).

For weld joints with a lesser aspect ratio (ratio of joint depth to width), the conventional circular type of wire guide may be positioned so that it does not extend into the joint, with only an unsupported length of wire protruding from the nozzle into the joint. For relatively short unsupported lengths of wire extending beyond the outlet end of a nozzle, this method can be satisfactory, although the requirement becomes more important that the unsupported length of wire be straight. This straightness requirement is difficult to achieve due to the inherent tendency to be deformed from a linear shape after being unwound from a typically small-diameter spool. However, for extremely thin joints with a greater aspect ratio, it is preferred that the wire guide extend to near the bottom of the joint so that the wire position is more accurately and consistently located with respect to the target portion of the weld pool, and with respect to the tip of the electrode (for non-consumable electrode processes).

SUMMARY OF THE INVENTION

The present invention is an apparatus for feeding fusible filler metal wire or other metal forms into reduced-width, high-aspect-ratio (ratio of depth to width) metallic joints with control and stability of the filler metal position as it enters the molten pool area. The filler material guide nozzle assembly is designed with a thin, but stiff non-circular cross-sectional shape, with its width dimension significantly greater than its thickness dimension, and can be utilized in very reduced-width welded or otherwise fused joints to provide the accuracy and stability required for reliable filler material addition. This type of nozzle can be applied in situations where the joint does not have sufficient width to otherwise accommodate a conventional circular cross section (round, tubular) nozzle of sufficient strength to avoid greater risk of undesirable bending deflections, or to accommodate a thin weld torch assembly within the joint.

During use with welding, brazing and similar processes, the outlet end of the nozzle is located within the joint near the bottom, close to the area to be fused. The width dimension of the nozzle apparatus is oriented parallel to the depth of the weld joint, and the thickness dimension is oriented perpendicular to the depth of the joint. The thickness of the nozzle apparatus is less than the thickness of the joint between the components to be fused with the filler metal, allowing the outlet end of the nozzle to be fitted within the joint and in closer proximity to the molten pool during the joining process.

This nozzle apparatus is suitable for automatic and mechanized electric arc or power beam type of welding or brazing processes, such as the gas tungsten arc (GTA) process or the laser beam process. Brazing is distinguished from welding in that the parent materials are not melted to any significant degree, since in brazing the filler metal melts at a substantially lower temperature than the parent metals.

In addition, the apparatus can be beneficially utilized for deposition of wire which is either a combined consumable electrode and a filler metal such as in the metal inert gas (MIG) process, or only a filler metal, such as in the GTA process. Other forms of continuously consumed or preplaced filler materials, such as fluidized powder or paste, are also suitable for use with the apparatus. In addition to filler materials, other materials such as fluxes and surfactants may be applied with the nozzle assembly of the invention.

The nozzle apparatus of the invention may be suspended from the welding torch block in conventional fashion. A primary advantage of the nozzle apparatus of the invention is that it permits direct visual or remote camera viewing of the internal lower portion of the joint, without significant obstruction of the view by the filler material feed guide nozzle. Other technical advantages include the option for multifunctional capabilities to improve other characteristics of the joining process and completed joint. An example of this capability is the addition of alloy enrichment and doping materials for local chemistry and corresponding material property control.

Welding and other fusion process productivity advantages include the capability to reduce the number of passes required by decreasing the joint volume, and therefore decreasing the total process time and cost. Additional productivity advantages include incorporation of features which would otherwise be applied as separate processes before or after the welding process is implemented, such as temperature measurements and dimensional inspections.

BRIEF DESCRIPTION OF THE DRAWINGS

FIG. 12A is a front view of a composite filler nozzle and non-consumable electrode in accordance with a sixth preferred embodiment of the invention.

FIG. 12B is a side view of the non-consumable electrode incorporated in the composite structure depicted in FIG. 12A.

FIG. 12C is a detailed plan view of a hot wire variation of the preferred embodiment shown in FIGS. 12A and 12B.

DETAILED DESCRIPTION OF THE PREFERRED EMBODIMENTS

Figure 1:
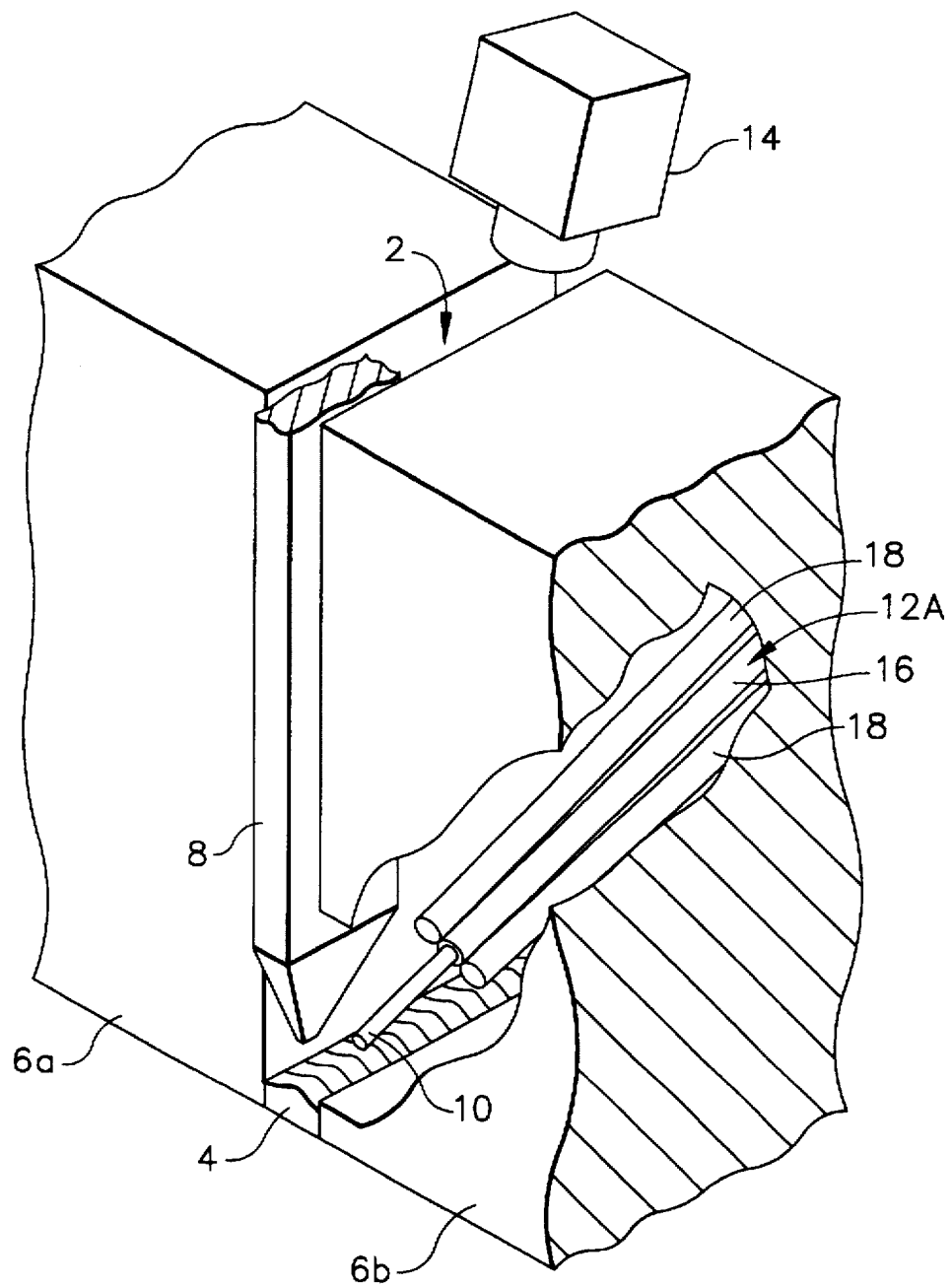
FIG. 1 is a schematic showing a filler material nozzle assembly with cylindrical stiffener for use in a reduced-width groove in accordance with a first preferred embodiment of the invention.
Figure 2:
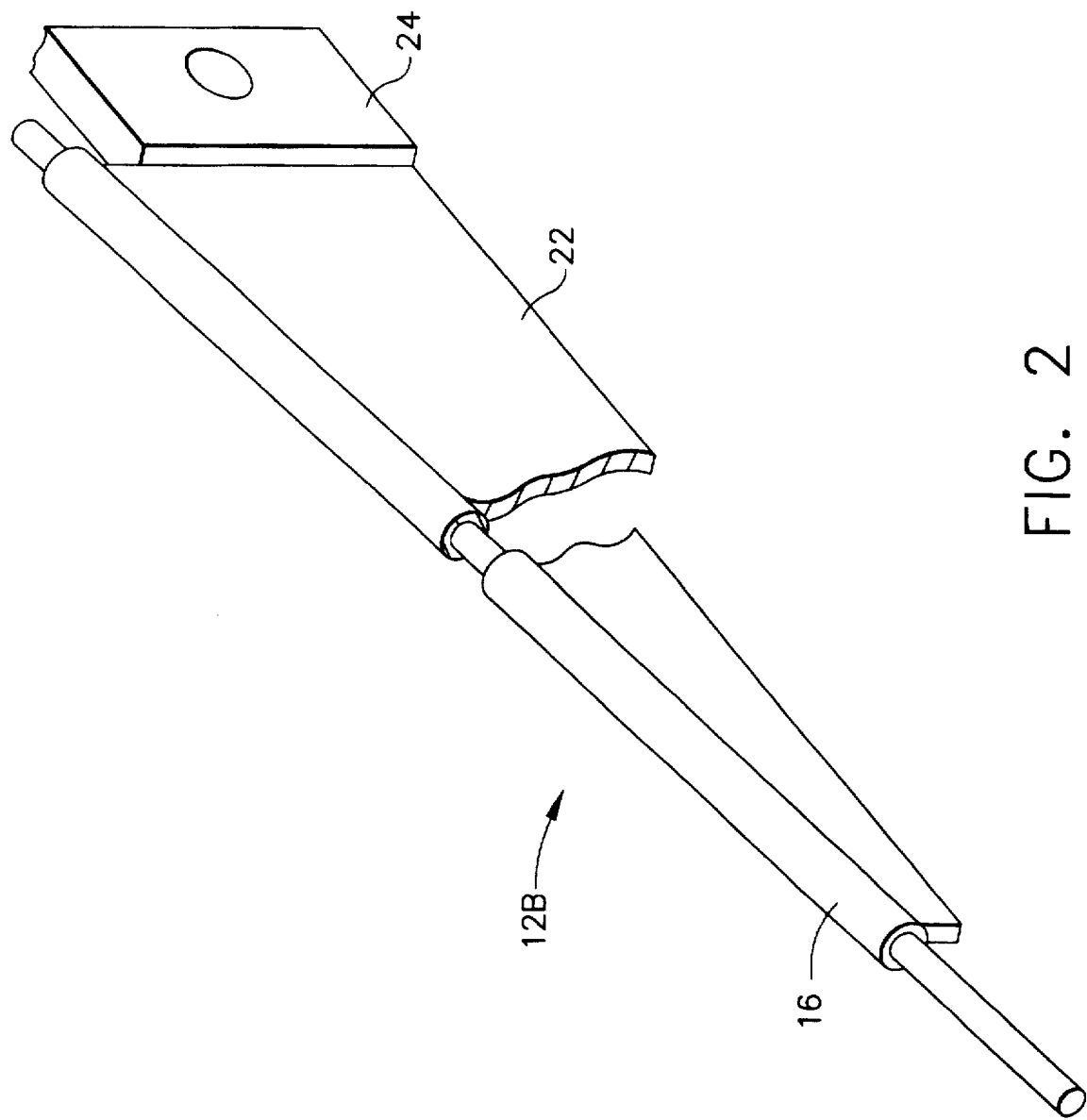
FIG. 2 is a schematic showing a filler material nozzle assembly having a segmented design with flat stiffener in accordance with a second preferred embodiment of the invention.

The filler material nozzle assembly of the present invention can be used as part of a gas tungsten arc welding (GTAW) system adapted for welding a reduced-width groove 2 to form a welded joint 4 between parts 6a and 6b, as seen in FIG. 1. The GTAW system has mechanized torch movement and a tungsten electrode 8 with a geometry designed to fit in the reduced-width groove 2. The sidewalls of groove 2 preferably have an acute angle less than 5°. The blade of electrode 8 has a non-circular cross section. In particular, the blade cross section has an elongated dimension which is oriented parallel to the length of the weld joint and a shortened dimension which is oriented perpendicular to the length of the joint, e.g., a cylinder having a generally rectangular cross section.

The weld beads 4 are deposited inside the groove 2 using the thin elongated tungsten alloy electrode 8 to melt the filler wire 10 fed into the groove by a filler material nozzle assembly 12A. Electrode 8 fits inside groove 2 with clearance between the electrode and the sidewalls. The blade of electrode 8 is optionally covered with a ceramic coating to prevent arcing to the sidewalls of groove 2. The welding electrode 8 is powered by a conventional arc power supply (not shown) to produce a primary arc. The flat electrode 8 and flat filler material nozzle assembly 12A, in conjunction with the small bevel angle and selected welding parameters, produce a very thin weld joint. During welding, the arc, weld pool and filler material can be observed using a remote viewing camera 14.

In accordance with a preferred embodiment of the invention, the filler material nozzle apparatus 12A has a non-circular cross section. In particular, the cross-sectional shape of the filler material guide nozzle assembly is designed to be thin in a direction perpendicular to the depth and length of the weld seam, and wide in a direction parallel to the seam. Also, the height and/or width may be tapered along the length of the nozzle assembly in order to provide as much stiffness as possible toward the inlet (mounted) end, and to be as narrow and thin as possible toward the outlet end. The preferred form of the filler material is continuous wire, but may have other forms, such as a gas-fluidized powder. Several possible designs of the non-circular nozzle apparatus are shown in FIGS. 1 through 11. Also possible is the option of using non-circular cross-section filler wire or strip, which increases the surface area and therefore improves the heat transfer area and melting efficiency.

The reasons for using a non-circular (e.g., blade-shaped) nozzle apparatus include the following: A) to provide a lateral stiffness to the nozzle sufficient to maintain adequate filler metal position guidance, while providing only the minimum practical width (in a direction perpendicular to the walls) when used in joints of reduced width which would otherwise be too narrow to be filled; B) to provide increased nozzle flexural strength both parallel and perpendicular to the joint depth so that the desired filler metal guidance is maintained, despite inadvertent physical handling or abusive nozzle mechanized steering; C) to provide a minimum nozzle width (in a direction perpendicular to the weld seam) so that the view in the joint from a remote weld-viewing camera is not obstructed by the portion of the nozzle passing through the view; D) to provide sufficient nozzle height (in a direction parallel to the joint depth) to allow multiple joining-related functions to be implemented simultaneously, or specific single functions to be implemented more efficiently and productively with the same nozzle assembly as used for the joining process; and E) to allow the nozzle to extend close to the bottom of a very reduced-width joint for powder feed additions directly into the filler metal molten pool. Fluidized powder, if fed from a larger nozzle not within the joint, would diverge excessively within the joint and result in a significant loss of filler material deposition efficiency into the pool.

The non-circular nozzle assembly can be fabricated from a piece of small circular or non-circular tubing 16, at least the tip of which is joined to a pair of high-strength rod or bar stock stiffeners 18 (see FIG. 1) arranged on opposing sides thereof. In the alternative, only one stiffener 18 can be used. Filler wire 10 is fed through tubing 16, with the nozzle assembly 12A being positioned such that the end of the filler wire 10 is located at the site of the weld bead to be formed.

The tubing 16 (hereinafter "filler guide nozzle") can be made of tungsten (such as is produced by the chemical vapor deposition technique), or of other high-yield-strength, wear-resistant material, such as metal carbide. The stiffener 18 as well as the filler guide nozzle 16 can be made from carbide, tungsten, etc., in order to produce the stiffest, most heat- and wear-resistant nozzle assembly practical, or of high-strength tempered steel to produce the toughest (fracture resistant) assembly.

Alternatively, a non-circular nozzle assembly 12B (shown in FIG. 2) has a circular tube 16 of very small diameter attached along its length to a stiffener such as the edge of a thin plate or piece of sheet stock 22. One configuration of stiffener is a long thin triangular piece of tungsten sheet (or other high-yield-strength material such as carbide) which is brazed, welded, mechanically fastened, or otherwise joined to the filler nozzle tube with the narrow vertex of the triangle at the outlet end of the tube. This configuration provides the greatest resistance against bending when the nozzle assembly is mounted on a mounting bracket 24 as a cantilever at the wide end of the triangle. The mounting bracket 24 is connected to a drive apparatus (not shown) for raising and lowering the filler material nozzle assembly.

Figure 3A:
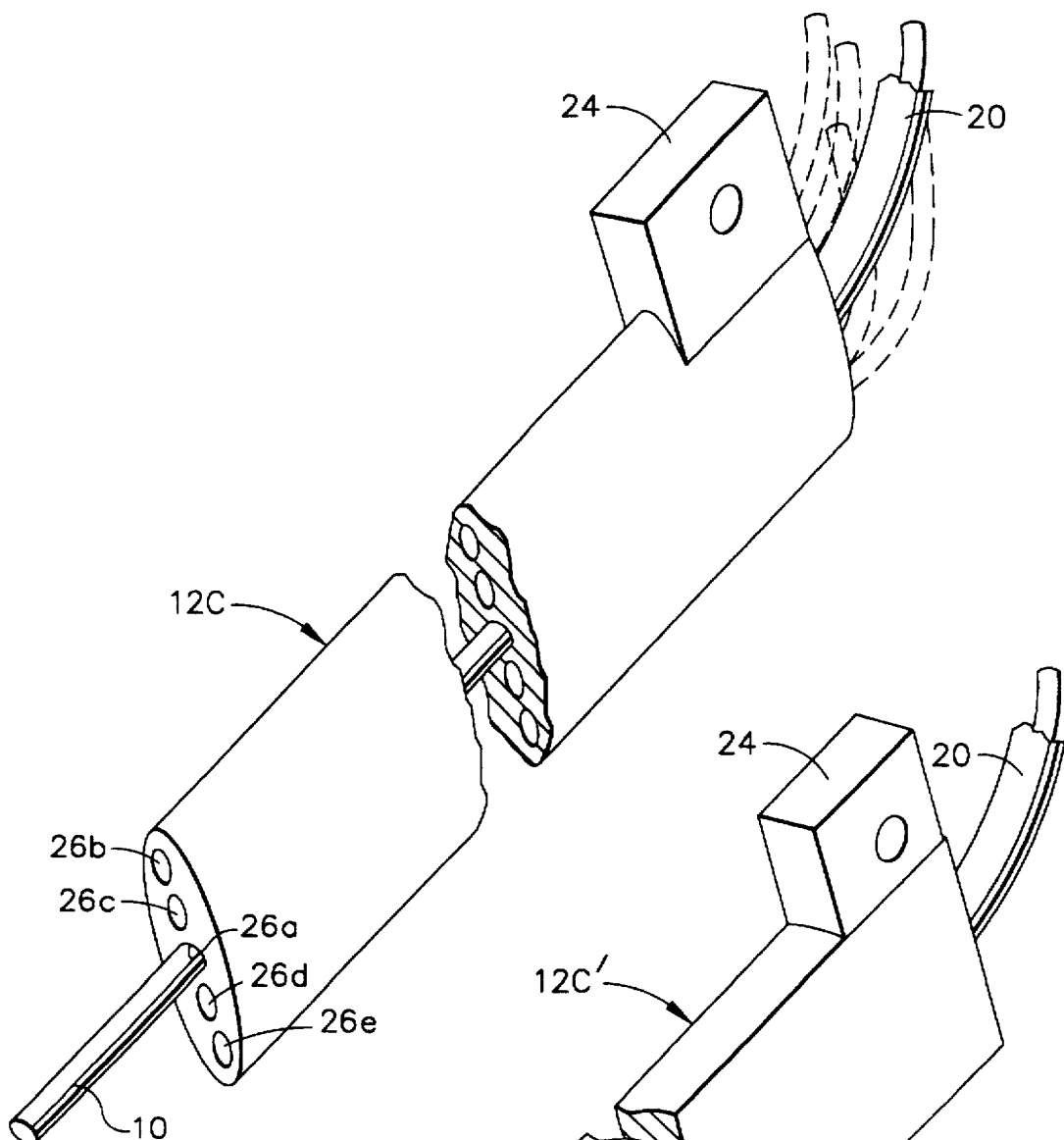
FIG. 3A is a schematic showing a filler material nozzle assembly having a monolithic design with optional means for sensing or control in accordance with a third preferred embodiment of the invention.
Figure 3B:
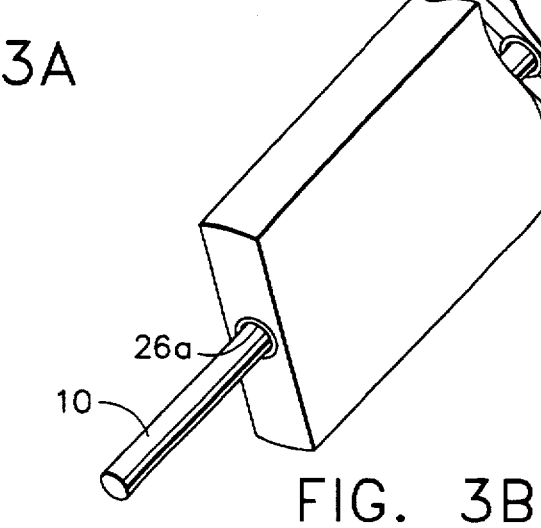
FIG. 3B is a schematic showing a filler material nozzle assembly having a monolithic design similar to that of FIG. 3A, but without means for sensing or control.

In accordance with a further preferred embodiment, the filler nozzle assembly has multiple functions. The wire (or other form of filler material) nozzle assembly can have functions other than to guide the position of the end of the wire at the work, and may be made from an assembly of tubes or be fabricated from other shapes to form multi-hole configurations (such as a "honeycomb" type). FIG. 3A shows a monolithic filler nozzle 12C having a hole 26a serving as the filler material guide nozzle and additional holes 26b–26e serving as channels for shielding gas or temperature sensing means, such as a resistance temperature device or an infrared fiber-optic probe which is pushed through the conduit. The guide nozzle guides the filler material from a point outside the weld groove to a desired location inside the groove, namely, in proximity to the weld puddle. The filler material is guided into the nozzle by a conduit 20. FIG. 3B shows a monolithic filler nozzle 12C' having only one hole 26a serving as the filler material guide nozzle. The monolithic filler nozzle 12C' is fabricated by machining round stock to form parallel or slightly tapered flat faces on opposite sides. Alternatively, nozzle 12C' can be made from bar stock.

In the case of a multi-tube embodiment, one or more of the tubes can be used as mechanical stiffeners, and still others may perform different process functions. When tubes are used as mechanical stiffeners only, solid bars or rods made of very high yield strength and elastic modulus materials, such as full hard steel, tungsten alloy, etc. may be substituted for these portions of the assembly. (Hereinafter, the term "rods" will be used to mean rods and/or bars.) For maximum nozzle rigidity, all parts of the assembly are made from high-strength, high-stiffness materials. In any multiple tube/rod design, the composite assembly's lateral bending strength is significantly greater than that of an individual tube having a diameter equal to the assembly width.

The length of the stiffener tubes or rods may be staggered shorter than the length of the filler nozzle, as required, in order to provide sufficient clearance to the electrode edge and to the bottom of the joint. The nozzle may be located in a symmetrical or non-symmetrical array of stiffener tubes or rods, as required, to adjust these clearances to the adjacent electrode and work surface.

Figure 4:
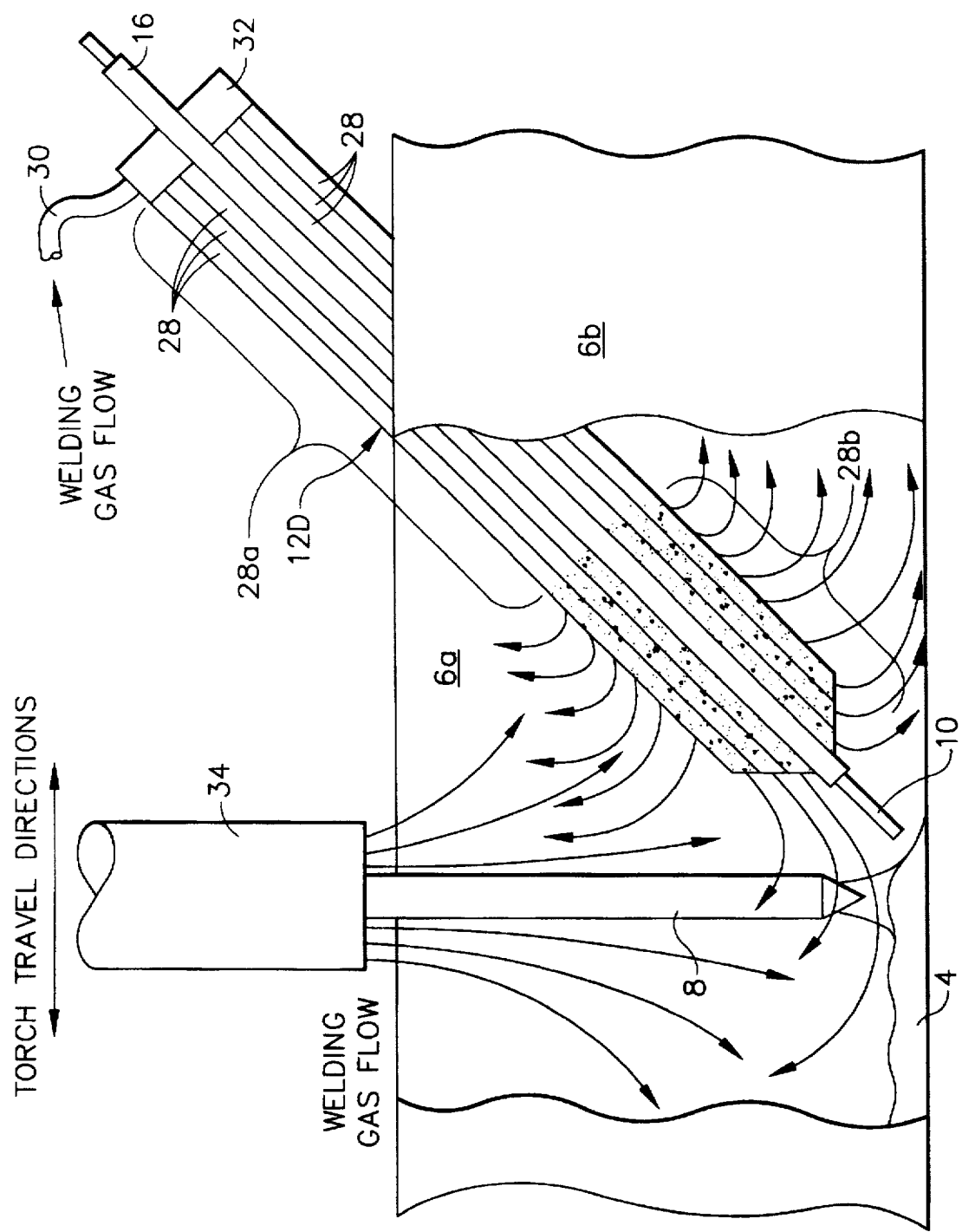
FIG. 4 is a sectional view through a weld joint of a filler material nozzle assembly with an integral gas lance having porous tubes in accordance with one variation of a fourth preferred embodiment of the invention.

In accordance with a further preferred embodiment of the invention, a gas lance incorporated in a composite gas lance/filler nozzle assembly 12D can be used for additional welding gas delivery (hot/molten bead-shielding gas and/or welding arc-forming gas) to the local weld area, as shown in FIG. 4. In some very deep joints, the gas lance may be the only source of welding gas. This configuration can improve the local welding gas quality near the root of the joint by minimizing the gas dilution, and can reduce the total flow rate required for sufficient weld bead coverage (as compared to the practice of feeding gas from a gas cup external to the joint).

A primary portion or all of the welding gas may be fed directly to the lower portion of the joint through the gas lance, which may comprise a multiplicity of integral gas distribution tubes 28, each tube having a non-porous section 28a which acts as a conduit and a porous section 28b which acts as only a diffuser if the distal end is closed. The porosity of the tube walls is indicated by speckling in FIG. 4. The respective tubes 28 of the gas lance act as conduits/diffusers for the primary welding gas flow supplied via line 30 and gas header 32. Optionally, an auxiliary welding gas flow may be provided from above the joint via a conventional gas cup 34 with gas diffuser lens in order to protect the hot electrode from oxidization, as well as to supplement the gas flow from the gas lance within the joint. The compositions of the gases coming from above the joint and from within the joint may be different, since the auxiliary inert bead coverage gas would be provided primarily by the conventional gas cup 34, and the arc-forming gas (with tailored ionization potential and heat transfer properties) as well as the coverage gas would be provided primarily by the gas lance.

The new design of welding gas nozzle assembly disclosed herein, which can be shaped in the form of a composite lance, may have a portion toward the outlet end made of reticulated porous tubing material so as to reduce turbulence with the atmosphere outside of the joint (by reducing the local flow velocity and Reynolds number), and to allow laminar type flow within the joint in the vicinity of the deposited beads. [The Reynolds number, $Re=\rho VL/\mu$, where $\rho$ is the density of the fluid, V is the flow velocity, L is the characteristic length descriptive of the flow field, and $\mu$ is the viscosity of the fluid. The nature of the flow (laminar or turbulent) is determined by the value of the dimensionless number Re.] The outlet ends of the tubing may be closed with porous or non-porous material in order to force more of the gas out the pores in the tube walls than would occur if the tubing were open-ended.

Alternate forms of construction of the porous material include electro-etched or laser-drilled drawn tubing or flat-sided channel fabricated from sheet stock which is perforated at least near its outlet end either before or after assembly. Examples of some variations of these designs are shown in FIGS. 5 through 9.

Figure 5:
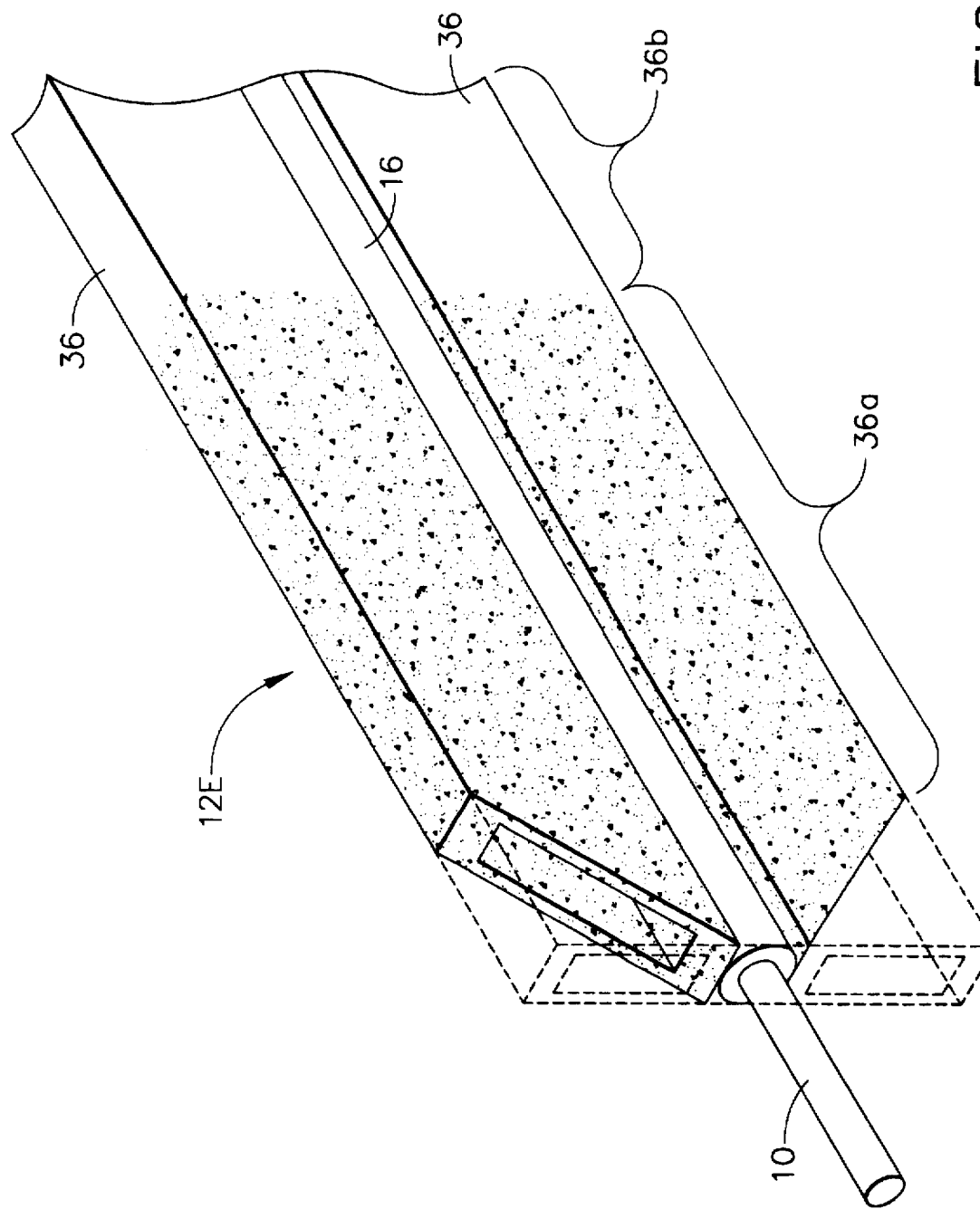
FIGS. 5 through 10 are detailed views of the outlet end of five different variations of a filler material nozzle assembly with integral gas lance in accordance with the fourth preferred embodiment, including: a porous channel variation (FIG. 5); a triple-wall porous channel variation (FIG. 6); a multiple tube variation (FIG. 7); a porous skin variation (FIG. 8); a corrugated channel variation (FIG. 9); and a coil spring gas distribution variation (FIG. 10).

The filler guide nozzle assembly 12E shown in FIG. 5 comprises a pair of open-ended welding gas flow channels 36 joined to opposing sides of the filler guide nozzle 16, each channel having a porous section 36a (indicated by speckling) and a non-porous section 36b. The ends of the channels 36 may optionally be perpendicular to the axis of the filler guide nozzle, as indicated by dashed lines in FIG. 5.

Figure 6:
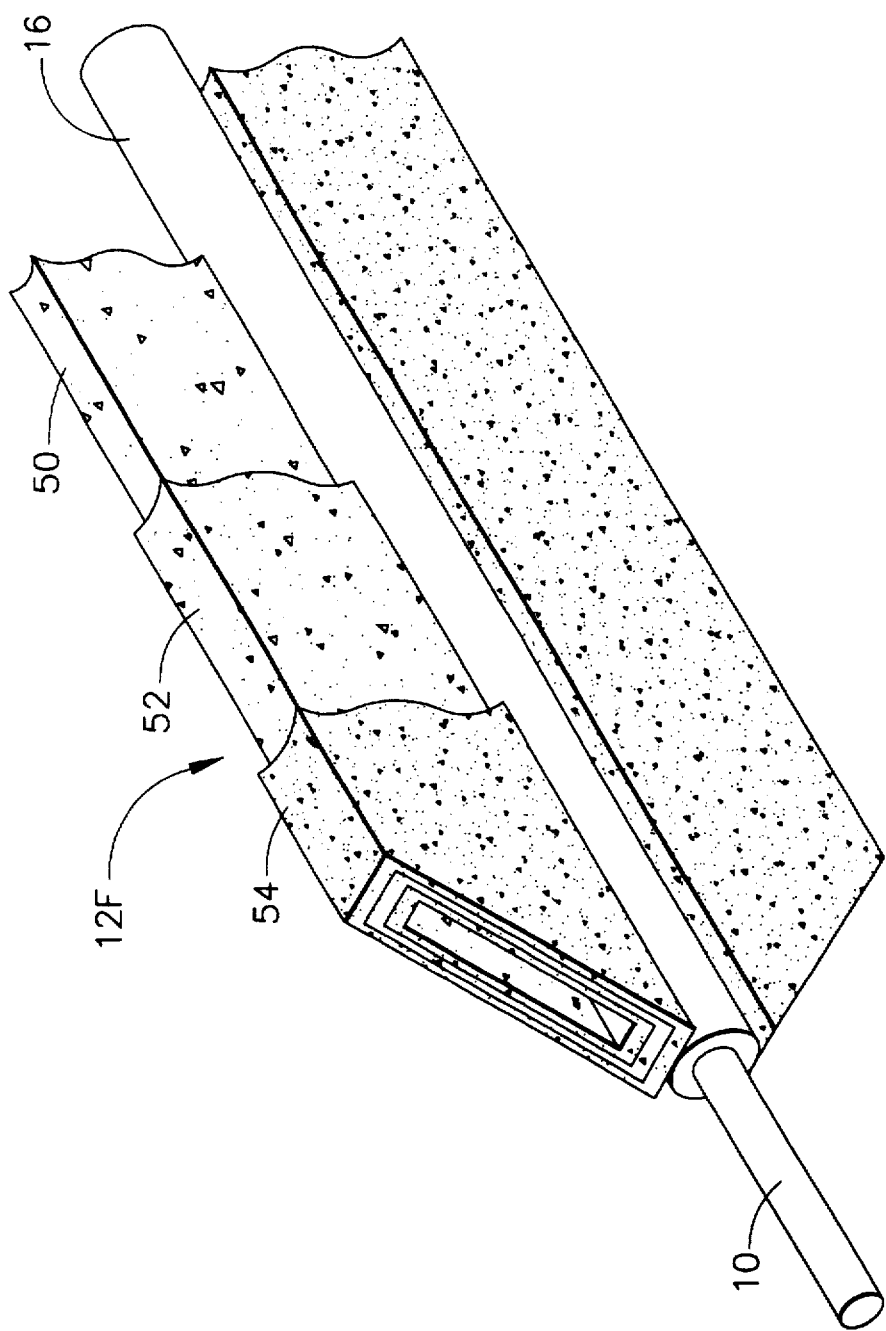

In accordance with a further variation shown in FIG. 6, the porous section of each channel of a filler guide nozzle assembly 12F may consist of multiple porous walls nested one inside the next, e.g., an inner porous wall 50 of coarse-grade porosity, a middle porous wall 52 of medium-grade porosity and an outer porous wall 54 of fine-grade porosity.

Figure 7:
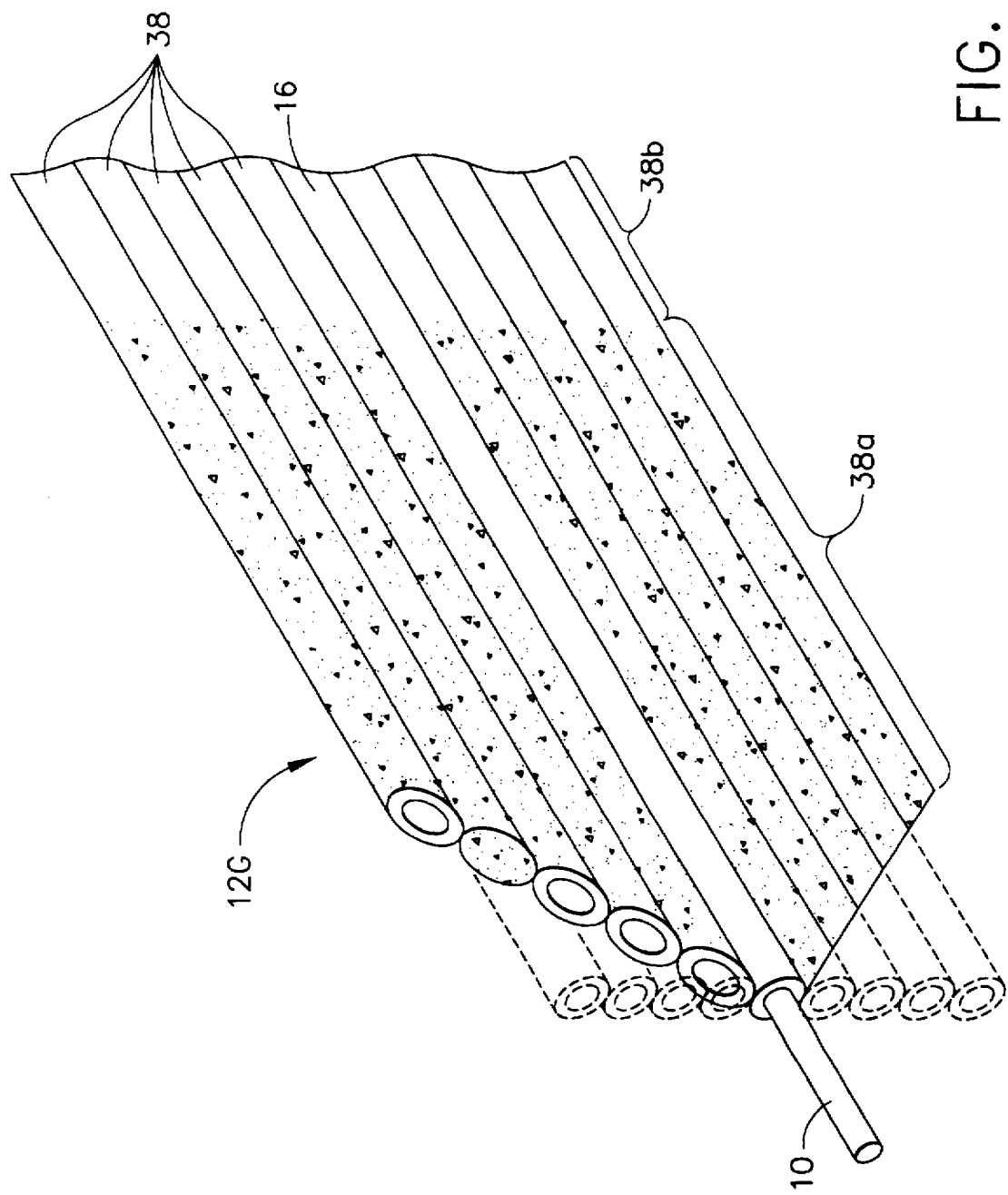

Alternatively, the filler guide nozzle assembly 12G shown in FIG. 7 comprises two arrays of parallel gas distribution tubes 38 joined to and extending from diametrally opposed sides of a filler guide nozzle 16. The gas distribution tube arrays may be non-symmetrical relative to the filler guide nozzle. Each tube 38 has a porous section 38a (indicated by speckling) and a non-porous section 38b, in analogous manner to the embodiments previously described. The distal ends of the tubes 38 may be angled (as shown by solid lines in FIG. 7) or perpendicular (as shown by dashed lines in FIG. 7) to the filler guide nozzle axis, and may be open or closed.

Figure 8:
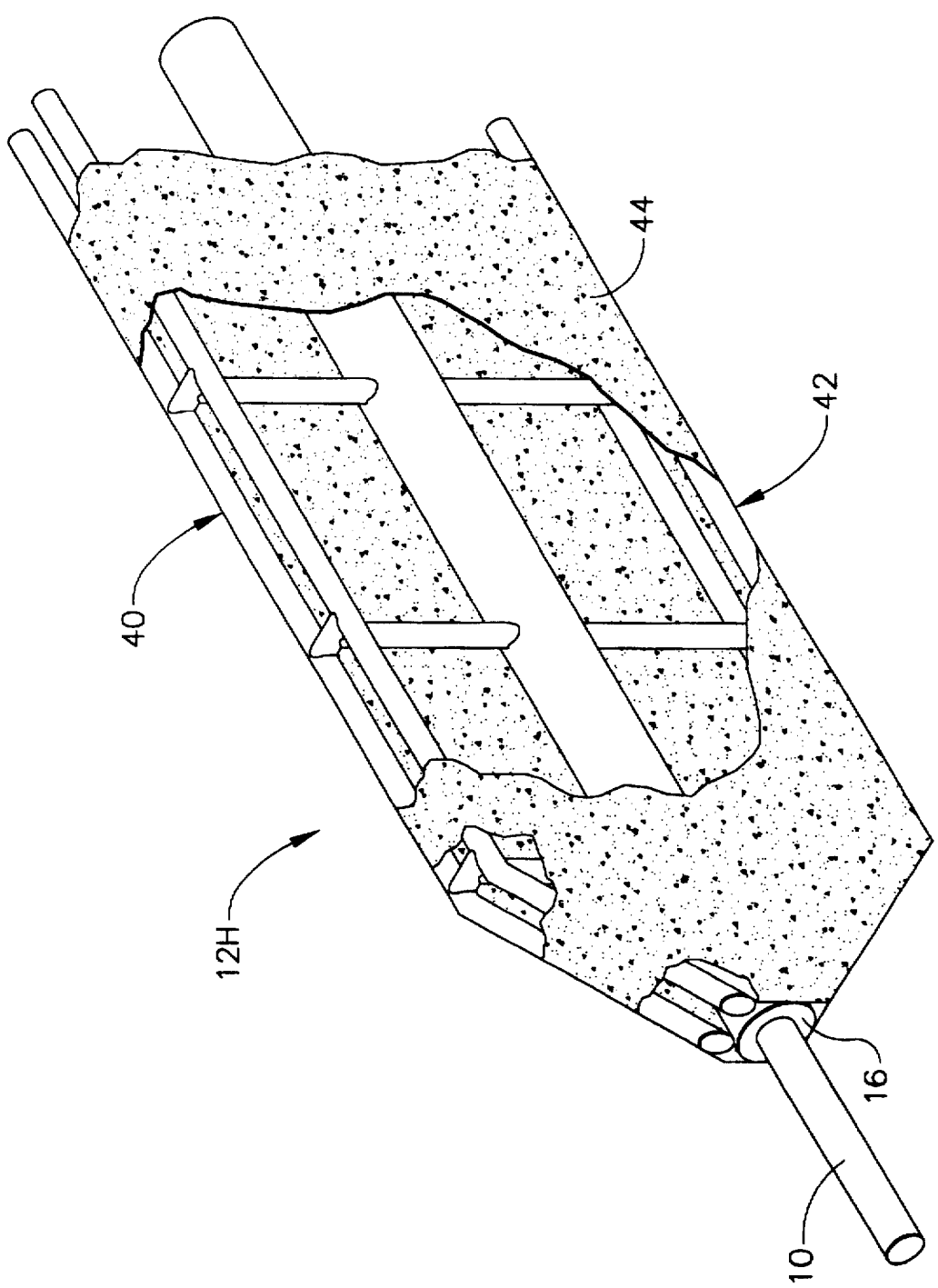

In accordance with yet another preferred embodiment shown in FIG. 8, a filler guide nozzle assembly 12H has integral gas lance comprising upper and lower support frames 40 and 42 joined to the filler guide nozzle 16. A porous skin 44 is stretched across the support frames 40 and 42 to form a chamber which is filled with pressurized welding gas. The porous skin may take the form of an electroformed or laser-drilled perforated stainless steel sheet material. A non-porous skin (not shown) can be stretched over portions of the support frames remote from the nozzle outlet to form a conduit for carrying the welding gas to the chamber. The pressurized welding gas in the chamber diffuses through the porous skin 44 and fills the surrounding volume of the welding groove.

Figure 9:
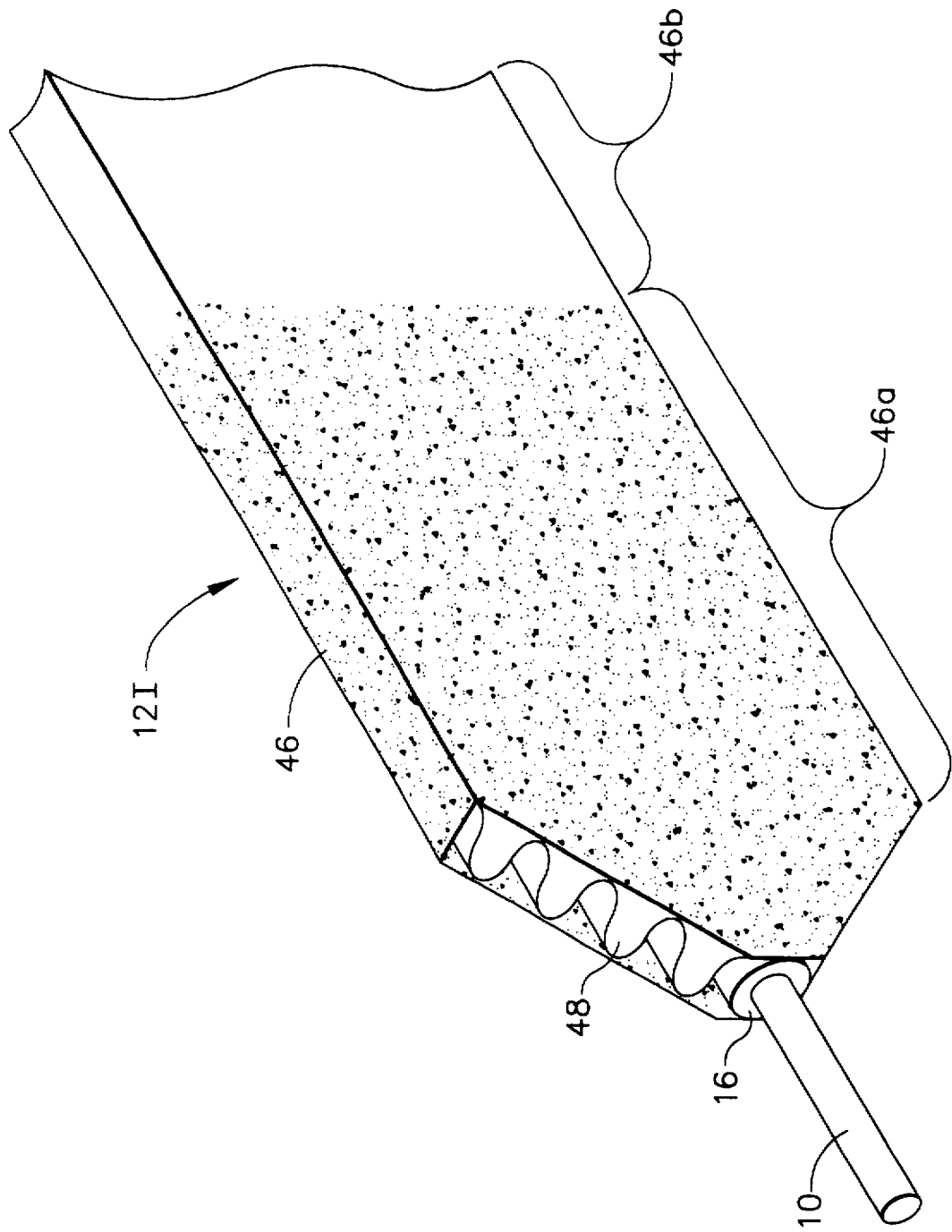

In accordance with a further variation shown in FIG. 9, a filler guide nozzle assembly 12I comprises a thin housing 46 supported by a corrugated spine 48. The corrugations preferably run parallel to the filler guide nozzle axis. The peaks and valleys of the corrugations preferably contact the inner surface of the housing 46 to provide support and to form a series of parallel channels for welding gas flow. The thin housing 46 has a porous section 46a (indicated by speckling) and a non-porous section 46b, in analogous manner to the embodiments previously described. The distal end of the housing 46 may be angled or perpendicular to the filler guide nozzle axis, and may be open or closed.

Figure 10:
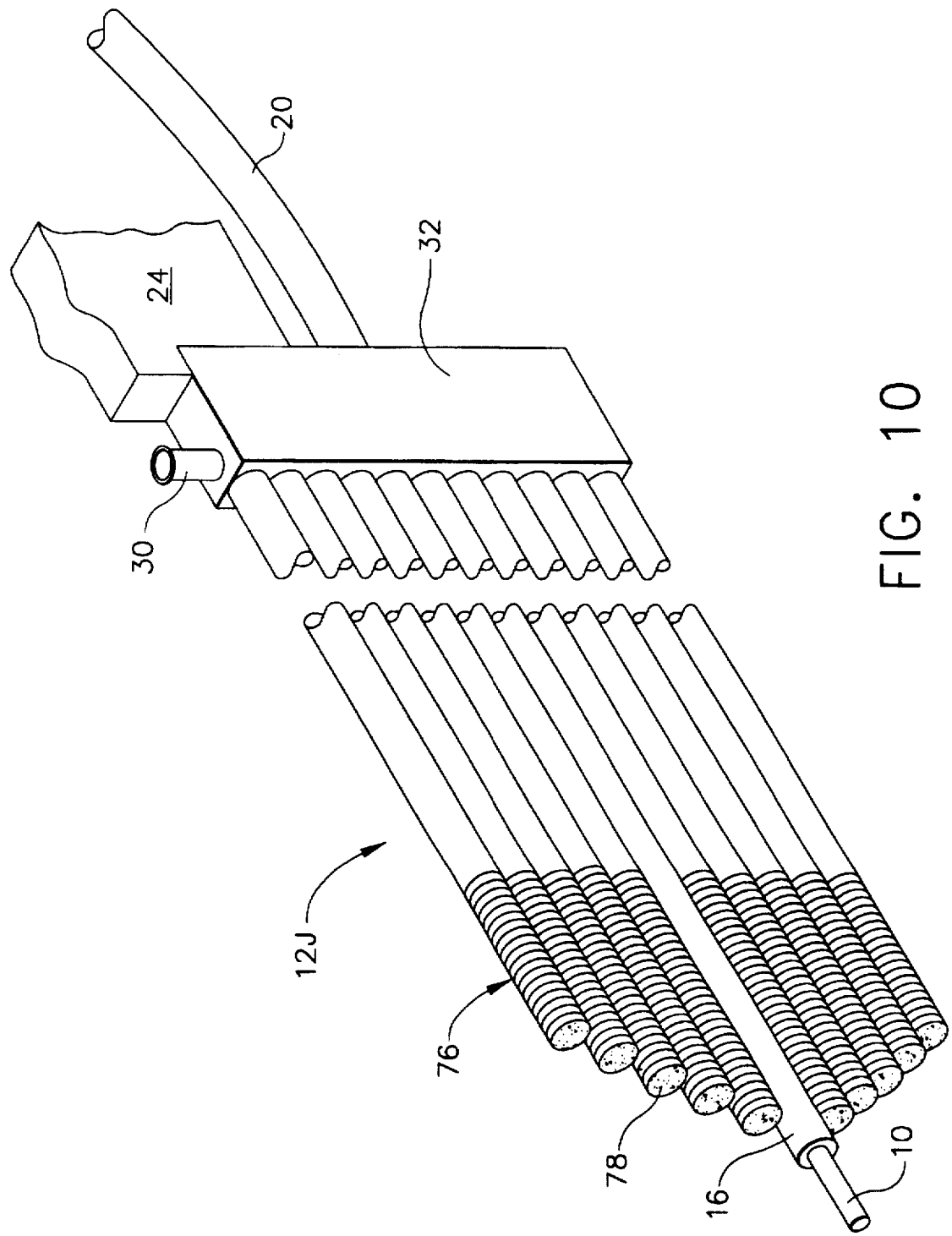

In accordance with the variation shown in FIG. 10, a filler guide nozzle assembly 12J comprises two arrays of parallel gas distribution tubes 74 joined to and extending from diametrally opposed sides of the filler guide nozzle 16. Each tube 74 has a coil spring section 76 attached to its end. The end of each coil spring is closed by a plug 78, which may be porous. The porosity of the plug and the spring constant of the coil spring are selected so that welding gas flow supplied via line 30 and gas header 32 under pressure will diffuse through the turns of the coil spring. This creates a laminar flow of gas inside the weld groove. The distal ends of the coil springs 76 are preferably angled (as shown in FIG. 10). In accordance with a further improvement, the coil spring section may comprise concentrically arranged coarse and fine coil springs.

In accordance with the broad concept of the present invention, dual lance assemblies may be located on the leading and trailing sides of the electrode, with respect to the torch travel direction. These assemblies may be used alternatingly depending on the travel direction or simultaneously independent of travel direction, as required, to obtain sufficient flow to establish both a stable arc voltage and high-purity weld deposit inert gas coverage.

Figure 11:
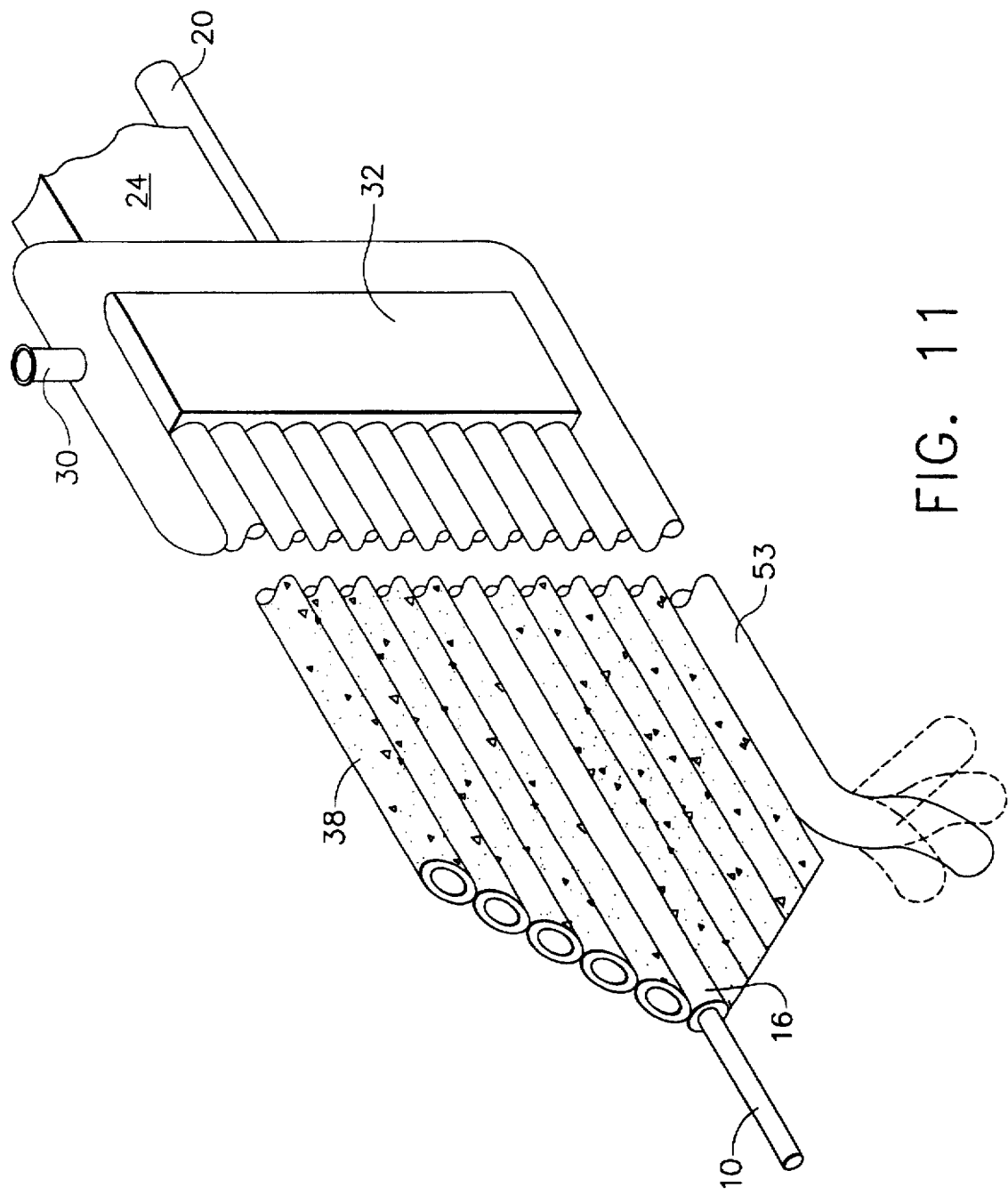
FIG. 11 is a schematic showing a gas dam mounted on a filler material nozzle assembly with integral gas lance in accordance with a fifth preferred embodiment of the invention.

Referring to FIG. 11, a gas-confining or sealing dam 53 may be effectively used on the leading or on the leading and trailing sides of the torch to confine a portion of the inert gas to the vicinity of the weld pool area. These movable dams may be an integral part of the filler material nozzle assembly, may be mechanically attached to the assembly, or may be mounted separately ahead of and/or behind the lance type of nozzle. The dam would extend a significant distance into the joint and would also extend across a significant fraction of the joint width so as to effectively minimize contamination of the inert gas with the surrounding atmosphere in the groove.

The dams would preferably be made of a compliant material (with a non-compliant support structure) so that a more effective seal can be achieved to the inside surfaces of the joint. An example of this type of seal is woven metal mesh (or silicon rubber tubing or sponge) filling a canted-coil spring, with a solid rod passing through the mesh and extending a portion of the length of the spring. The rod is made, e.g., of spring steel having a small enough gauge to allow the rod to flex. For higher sealing efficiency, the gas dams may be mounted such that they are spring loaded in the lateral and depth directions to make essentially continuous contact with the joint walls and root surface.

Referring back to FIG. 2, the optional nozzles 12b–12e can also be used to deliver solid additives to the weld pool, such as powders for alloying effects, including in-situ alloying with noble metal catalytic elements (e.g., palladium), enrichment with stress corrosion cracking-resistant elements (e.g., chromium), or fluxes and surfactants to improve weld penetration and/or wetting. Additives may also be introduced which do not alloy with the weld material, but form a composite structure instead.

The optional nozzles 12b–12e of the monolithic nozzle 12C can also be used to deliver the main source or an auxiliary melting heat source for the joining process, such as laser light passing through fiber optics in the nozzles. This variation can be especially useful for work in very reduced-width joints with laser systems having higher beam quality, which allow sufficiently focused heat to be fiber-optically delivered to the weld pool without the need for space-taking objective lenses at the end of the fiber.

A non-circular nozzle assembly can be made with a triangular (or rod-shaped) electrode/stiffener 56 fabricated from tungsten or other suitable high-temperature alloy, which functions both as a non-consumable welding electrode and as a nozzle stiffener, as shown in FIGS. 12A and 12B. A triangular-shaped electrode/stiffener made from tungsten alloy sheet stock can provide sufficient cross-sectional area at its base (wide) end so that it can successfully resist unacceptable bending, as well as carry exceptionally high arc current despite its minimum thickness. The base of the triangle is clamped or otherwise held by an electrode holder 58. Electrode holder 58 is preferably made of a conductive, oxidation-resistant material such as copper alloy (e.g., beryllium copper alloy), optionally electroplated with silver or nickel. The electrode holder preferably takes the form of a T-shaped metal body, comprising a shank 58a and a crosspiece 58b. Shank 58a is connected to a conventional welding torch (not shown). Crosspiece 58b has a longitudinal slot shaped for receiving the triangular blade base with sufficient play to allow easy insertion and removal. The blade base is held securely in the crosspiece slot by tightening a pair of set screws 60 in a corresponding pair of threaded holes formed in the crosspiece. The blade can be readily removed from the holder after the screws have been loosened. This allows easy replacement of a damaged electrode/stiffener blade. Alternatively, instead of using screws, the blade could be secured in the holder by brazing to create a monolithic blade assembly, i.e., the blade would not be readily replaceable. The blade body 56 is preferably covered with an insulating coating, e.g., $Al_2O_3$ or $Y_2O_3$, to prevent arcing to the welding groove sidewalls. Also, all rough edges on the stamped or cut blade are deburred to prevent arcing. In accordance with the preferred embodiment, the flat triangular blade incorporates one or more insulating stand-offs 62. Each stand-off 62 consists of a slug of insulating material, e.g., $Al_2O_3$ or $Y_2O_3$, having a cylindrical peripheral wall and a pair of slightly convex opposing surfaces or radiused edges at each end of the cylinder. As best seen in FIG. 12B, each insulating stand-off 62 protrudes on both flat sides of the electrode blade beyond the plane of the blade surface. These stand-offs serve to maintain a minimum gap between the sidewalls of the welding groove and the flat sides of the electrode/stiffener blade, thus preventing scratching or excessive wear of the ceramic coating during electrode travel in the welding groove. A sufficiently deep scratch on the coated surface of the blade will remove the ceramic coating, leaving the blade susceptible to arcing along the uncoated locus.

If the filler guide nozzle 16 is electrically common with the stiffener 56, then the filler wire 10 becomes the consumable electrode, as in metal inert gas (MIG) welding. In this case, the replaceable tip 55 (see FIG. 12A) can be removed. Alternatively, if the nozzle 16 is electrically insulated from the stiffener 56, then the stiffener is also a non-consumable electrode, as in tungsten inert gas (TIG) welding. Optional auxiliary nozzles 64, e.g., for carrying inert shielding gas, are shown by dashed lines in FIG. 12A.

In accordance with another variation shown in FIG. 12C, the filler guide nozzle 16 is welded to the stiffener 56 and a nozzle 66 for temperature sensing means (not shown) is joined to the other side of the filler guide nozzle 16. For the case where the filler wire is both a consumable electrode and a filler material, such as in MIG welding and flux cored arc welding, the nozzle is designed to conduct electrically to the wire in order to establish and maintain an arc from the melting end of the wire to the work. In this variation the nozzle is electrically insulated from the remainder of the welding torch. The filler guide nozzle 16 in this case comprises an electrical conductor 68 surrounded by an electrical insulator 70, which is in turn surrounded by structural tubing 72.

The stiffener(s) may be joined to and made electrically common with the filler guide nozzle apparatus by high-temperature brazing precision welding (e.g. laser, electron beam, electrical resistance), or other means without risk of overheating and melting the joint(s) of the assembly during use.

With regard to the aforementioned welding process sensing and control apparatus, the optional nozzles can also be used to deliver visible light to the local weld area to illuminate it for visual or machine inspection purposes. The light source for this purpose can effectively be delivered by an optical fiber or fiber bundle passing through one or more nozzles. "Structured light" may also be used to provide information to monitor or control the weld geometry.

The optional nozzles can also be used to deliver non-visible light (such as an infrared wavelength) to the local weld area to "illuminate" it for machine control, vision, or other inspection purposes either before, during, or after each joining pass. The light source for this purpose can also be delivered by an optical fiber or fiber bundle passing through one or more nozzles.

An additional nozzle(s) can also be used with miniature boroscope viewing within the weld joint while monitoring the local geometry of the weld bead and substrate. This configuration may be used in order to obtain a sufficiently wide-angle or higher-magnification view of the weld pool and adjacent area within the joint. For very reduced-width joints, this method of viewing may be preferred to that obtained with a camera objective lens located outside of the joint, since with the external viewing configuration the field of view is constricted by the sidewall cropping effect of the preferred narrow joint width.

Other nozzles can provide welding process position sensing or control of torch motion features such as torch lateral position in the joint, or height position above the weld bead, such as height sensing to provide the selected arc length/voltage as in automatic voltage control (AVC) systems. In these cases, the sensing is not based on the value of the arc voltage, but rather on independent means such as either contacting conductive or non-contacting proximity sensors.

With optional nozzles fitted with fiber optics, the delivered laser heat may also be used for purposes other than melting of the weld metal. Examples of such non-melting heat sources are precleaning, preheating, interpass cleaning, and/or post-weld heat treatment (PWHT) of the weld area in order to improve either the microstructural or residual stress condition of the joint, or to reduce risk of hot cracking or various forms of delayed cracking.

In accordance with a further aspect of the present invention, non-circular cross-sectional shaped filler wire may be used to increase the surface area of the filler metal before it is fed into the heat source, and therefore to improve the convection heat transfer into the material. For a given cross-sectional area of filler material, a noncircular shape has a thickness dimension which is less than the diameter of an equal-area circular shape, and therefore has a lower time constant for conduction heat transfer across this reduced thickness. The preferred orientation for a non-circular shape is with the width dimension facing the heat source.

For extremely thin joints, the non-circular wire shape should be oriented with its major cross-sectional dimension parallel to the joint depth. This orientation provides for the combined advantages of the greatest filler surface area, the least joint width, and the increased arc length passing across its wider surface (after impinging on its edge). The filler heating and melting period can thereby be efficiently used to greater advantage in this orientation.

Another advantage in decreasing the effective thickness and/or increasing the surface area of the filler wire (and the corresponding conduction heat transfer distance to its center) is an improvement in melting thermal efficiency, and can be directly related to the desired decrease in the weld total heat input, and/or the desired increase in filler deposition rate for a given heat input. By the same principles, the joining productivity can be increased for any total heat input by increasing the fraction of heat used to melt the filler, and decreasing the corresponding fraction of heat which contributes to excess melted parent material.

Alternatively, the hole in the filler guide nozzle may be non-circular, and may accommodate and maintain orientation (if desired) for continuous forms of non-circular filler material. Examples of such shapes are flat wire, ribbon, or textured-surface wire. A particular design of the non-circular nozzle allows a unique non-circular filler wire to be fed into the joint in order to maximize the ratio of surface area to volume of the wire and to minimize its effective thermal thickness. These features solve the problem of the melt-off rate of the wire typically being the time limiting step, with respect to the need to increase the overall filler metal deposition rate.

The non-circular filler material shape or textured filler material surface may be the existing condition which was formed at a previous time for a joining application, or it may be directly formed in the wire just before it is fed into the guide nozzle (such as by surface knurling or shape rolling).

A variation in filler wire shape applicable to either round or non-circular cross-sectional wire is bent or twisted wire (such as in a serpentine or helical shape), which provides increased heating time and melting efficiency. For a given volumetric feed rate of filler, the bent wire length is effectively shorter than the corresponding length of straight wire. Therefore, the effective linear feed rate into the heat source is slower (providing more time to be heated to its melting temperature) than the linear rate before bending.

In ¶¶( 1)–(10) hereinafter, variations of the preferred embodiments of the invention are described without reference to drawings.

(1) The non-circular cross-sectional shape of the nozzle assembly can have various "flattened" shapes, including elliptical, lenticular, oval, rectangular, etc. The passageway for the wire (such as a hole) may be located centrally, or may be offset to allow attachment of other apparatus and/or holes for other functions on the extended edges of the nozzle.

(2) The nozzle may be linear or non-linear along its axis as required, in order to accommodate optimum viewing while maintaining the preferred wire entry angle(s) into the weld pool. For very deep joints and low wire entry angles, it may be preferable to curve the nozzle assembly upward (toward the opening of the joint) on its inlet end in order to keep its length shorter and its corresponding stiffness higher.

(3) The nozzle may be fabricated as a composite of various more simple component shapes in order to achieve the desired overall flattened (non-circular) shape, nozzle hole position, and electrical conducting or insulating and other properties of selected areas of the assembly.

(4) The nozzle may be made from or reinforced with various materials (such as "piano/music wire", tool steel, etc.) to maintain both the highest yield strength and the modulus of elasticity and stiffness, especially perpendicular to its thickness. A composite configuration can also be used to provide adequate thermal damage and mechanical wear resistance.

(5) The nozzle may be guided by mechanical or other means to keep it in the preferred location in the joint, such as in the center position. The means of guidance may be passive, such as a mechanical follower contacting the sides of the weld joint, or active, such as a sensing and control system.

(6) The nozzle(s) may be mechanically (but not electrically) joined to the edges(s) of a nonconsumable electrode, in order to improve the stiffness of the thin assembly, as well as to easily maintain the required alignment between them. The heat in the electrode can also help to preheat the filler material so as to improve the melting thermal efficiency.

(7) For the case where the filler wire is only a filler material (and not a consumable electrode as well), such as in gas tungsten arc welding (also known as tungsten inert gas (TIG) welding), the nozzle may be designed to conduct electrically to the wire in order to preheat the wire before melting in the arc. This method is known in the industry as "hot wire" TIG welding. If the wire is electrically preheated, the nozzle assembly is preferably made with an electrically insulating, heat-resistant outer surface coating or structural layer to prevent possible grounding to the work. This insulating coating, which must have high mechanical and thermal shock resistance, may be formed on the nozzle components by thermally spraying a strong, high-temperature ceramic such as alumina, zirconia or yttria or mixtures thereof.

The hole for the filler wire may be lined with an additional material having increased electrical conductivity (such as alloys of beryllium, copper and silver) relative to the remainder of the assembly. All known designs of hot wire TIG nozzles have a significantly increased size and shape which prevents them from fitting in an extremely reduced-width weld joint, as is possible with the nozzle configurations of the present invention.

(8) The optional nozzles can be used for preheating the filler metal before it enters the molten pool with a fiber optic-delivered laser beam in a laser hot wire TIG configuration. This configuration combines the arc spreading characteristic of an electric arc necessary to heat the full width and sidewalls of a joint and a potentially variable bead surface geometry, with the more focused, higher-energy-density heating characteristics of a fiber-delivered laser source. Such a laser hot wire preheating method is more efficient to heat a uniform geometry (straight or only moderately bent) wire which would be significantly thinner than the joint and the width of the electric arc.

(9) Still other longitudinal holes in the nozzle assembly can be used for temperature sensing or control by installing thin temperature sensors, such as thermocouples or resistance temperature devices, which can measure the preheat and/or interpass temperatures as required. This configuration allows more accurate measurement of local temperatures at the hottest portion of the bead in the joint, rather than the typically monitored average temperatures measured away from the weld bead out of the joint. When multiple sensors are used, the temperature distribution along or across the joint may be obtained.

(10) The optional nozzles can also be used for local delivery of weld fluxing surfactants and/or weld penetration agents to enhance the performance of standard composition alloys. These agents can also be used to provide acceptable weldability of difficult "high-purity" alloys with respect to wetting and penetration control.

The filler material guide nozzle of the invention provides more accurate positioning of the filler metal in the joint in the preferred position of the heat source, reduced obstruction of the view of the interior of the joint, and the corresponding ability to improve the volumetric and thermal efficiencies of the joint by enabling the further reduction of the joint width. These improvements can result in fewer defects in the fused deposit, lower residual stresses, reduced thermal damage in the heat affected zones (HAZ), higher joining productivity, and increased welding torch hardware longevity.

In addition, the filler material nozzle assembly incorporating a gas distributor lance efficiently provide the required welding gas locally near the weld bead and electrode tip within the joint. This is an improvement over the conventional methods of inefficiently locating the gas distribution cup outside of the joint or providing a gas cup around the electrode within the joint, which must then be significantly wider than is the case for the nozzle configuration of the present invention.

The filler material guide nozzle of the invention has the advantage of being useable to deliver other joining related processes, such as local alloying additions and doping, auxiliary illumination, machine and visual inspection or imaging, weld bead and joint size measurement, and torch or filler material position control. Still other variations include preheat and interpass temperature measurement, pre/post heating of the joint, preheating of the filler material, welding gas dams for atmosphere confinement within the joint near the arc, and others.

The benefits of the filler material guide nozzle described herein can be realized on most welding and some brazing applications utilizing mechanized equipment with a local heat source in the joint, such as an electric arc or a fiber optic-delivered laser, or alternatively, with a remote heat source such as a lens optic-delivered laser beam, electron beam, etc. The greatest benefits can be achieved when the joint design is so volumetrically small and efficient (narrow width for a given depth) that the conventional type of nozzles are either too wide to fit in the joint with sufficient clearance for lateral adjustment and forward movement, or are too compliant to adequately maintain precise filler material position control.

The variation of a filler metal guide nozzle which is structurally integral with a welding gas distribution lance enables the depth of the joints which can be successfully completed to be increased well beyond the practical limit of conventional practices utilizing a flattened torch within the joint, or a flattened gas cup around the portion of electrode extending within the joint. This benefit can be achieved without resorting to the undesirable practice of increasing the width and corresponding volume of the joint. The gas lance can also be integrated with a compliant welding/cover gas dam to effect stable welding in very thin, high-aspect-ratio joint designs.

The various designs of the filler material nozzle assembly of the present invention can be used to feed the conventional form of round wire filler, as well as other higher-melting-efficiency forms such as flat wire, textured wire, bent or twisted wire, and powder or powder blends.

The apparatus and methods disclosed can be effectively used for both consumable and non-consumable electrode welding processes. For non-consumable processes, the filler material nozzle can be structurally integrated with the electrode to obtain alignment, stability, and pre-heating, and productivity benefits.

The foregoing preferred embodiments of the invention have been disclosed for the purpose of illustration. Variations and modifications of the disclosed method will be readily apparent to practitioners skilled in the art of welding. All such variations and modifications which do not depart from the concept of the present invention are intended to be encompassed by the claims set forth hereinafter.

I claim:

1. A filler material guide nozzle assembly having a non-circular cross-sectional shape adapted to fit in a very reduced-width weld groove, comprising:
   a tubular nozzle for guiding filler material to a desired location inside the weld groove from a location outside the weld groove, said nozzle having a circular outlet for the filler material at a distal end thereof and having a channel of circular cross section which communicates with said outlet; and
   a stiffening member joined to said tubular nozzle along a juncture which extends from a predetermined location along said nozzle to said distal end of said nozzle, wherein said nozzle and said stiffening member generally lie in a plane and form a structure which is more rigid than said nozzle alone.

2. The filler material guide nozzle assembly as defined in claim 1, wherein said stiffening member comprises a rod.

3. The filler material guide nozzle assembly as defined in claim 1, wherein said stiffening member comprises a sheet or plate having an edge joined to said nozzle.

4. The filler material guide nozzle assembly as defined in claim 3, wherein said edge is curved.

5. The filler material guide nozzle assembly as defined in claim 1, wherein said stiffening member is made of tungsten alloy.

6. The filler material guide nozzle assembly as defined in claim 1, wherein said stiffening member comprises a conduit.

7. The filler material guide nozzle assembly as defined in claim 6, wherein said conduit has a channel with a constant circular cross section, further comprising an optical fiber arranged inside said channel and extending the length of said conduit.

8. The filler material guide nozzle assembly as defined in claim 1, wherein said nozzle comprises an electrical conductor and an electrical insulator arranged to insulate said electrical conductor from said stiffening member.

9. The filler material guide nozzle assembly as defined in claim 8, wherein said electrical conductor is a tube having said channel formed therein.

10. A filler material guide nozzle assembly having a non-circular cross-sectional shape adapted to fit in a very reduced-width weld groove, comprising:
   a nozzle for guiding filler material to a desired location inside the weld groove from a location outside the weld groove, said nozzle having an outlet for the filler material at a distal end thereof; and
   a stiffening member joined to said nozzle, wherein said nozzle and said stiffening member generally lie in a plane and form a structure which is more rigid than said nozzle alone, wherein said stiffening member comprises a conduit comprising a distal section made of gas-permeable material and a section connected to said distal section made of gas-impermeable material.

11. The filler material guide nozzle assembly as defined in claim 10, wherein a distal end of said distal section of said conduit is closed.

12. A filler material guide nozzle assembly having a non-circular cross-sectional shape adapted to fit in a very reduced-width weld groove, comprising:
   a filler material guide nozzle having a channel of constant cross section and an outlet; and
   a gas distribution pipe joined to said nozzle, wherein said filler material guide nozzle and said gas distribution pipe generally lie in a plane, and said gas distribution pipe comprises a distal section made of gas-permeable material and a section connected to said distal section made of gas-impermeable material.

13. The filler material guide nozzle assembly as defined in claim 12, wherein a distal end of said distal section of said gas distribution pipe is closed.

14. A filler material guide nozzle assembly having a non-circular cross-sectional shape adapted to fit in a very reduced-width weld groove, comprising:
   a filler material guide nozzle having a channel of constant cross section and an outlet; and
   a gas distribution pipe joined to said nozzle, wherein said filler material guide nozzle and said gas distribution pipe generally lie in a plane, and said gas distribution pipe comprises a first porous wall having a relatively coarse-grade porosity and a second porous wall having a relatively fine-grade porosity, said first porous wall being nested inside said second porous wall.

15. A filler material guide nozzle assembly having a non-circular cross-sectional shape adapted to fit in a very reduced-width weld groove, comprising:
   a filler material guide nozzle having a channel of constant cross section and an outlet; and
   a gas distribution pipe joined to said nozzle, wherein said filler material guide nozzle and said gas distribution pipe generally lie in a plane, and a distal section of said gas distribution pipe comprises a coiled spring.

16. A filler material guide nozzle assembly having a non-circular cross-sectional shape adapted to fit in a very reduced-width weld groove, comprising:
   a filler material guide nozzle having a channel of constant cross section and an outlet;
   a gas distribution pipe joined to said nozzle, wherein said filler material guide nozzle and said gas distribution pipe generally lie in a plane;
   a compliant gas dam; and
   means for attaching said compliant gas dam to said nozzle assembly in a position such that gas exiting said gas distribution pipe and diffusing into the weld joint is blocked by said gas dam.

17. A system for welding in a very reduced-width weld groove, comprising:
   a welding electrode having an electrode tip inside the weld groove;
   a gas cup surrounding an upper portion of a blade of said electrode and located outside the weld groove, said gas cup directing a first flow of cover gas into the weld groove;
   a filler material guide nozzle for guiding filler material to a desired location inside the weld groove from a location outside the weld groove, said nozzle having an outlet for the filler material at a distal end thereof, said outlet being located in the weld groove; and
   a gas distribution pipe joined to said filler material guide nozzle and distributing a second flow of cover gas in the weld groove.

18. The welding system as defined in claim 17, wherein said gas distribution pipe provides a flow of inert gas having a first gas composition and said gas cup provides a flow of inert gas having a second gas composition different than said first gas composition.

19. A system for welding in a very-reduced-width weld groove, comprising:
   a welding torch;
   a welding electrode extending from said welding torch and adapted to fit in the weld groove, said electrode having a tip;
   an elongated block extending into the weld groove and comprising a first nozzle extending the length of said block, said elongated block having a width dimension greater than a thickness dimension, and said first nozzle having an inlet, an outlet and a constant cross section; and
   filler wire penetrating said first nozzle and extending out of said outlet of said first nozzle to a position below said electrode tip.

20. The welding system as defined in claim 19, wherein said elongated block further comprises a second nozzle extending the length of said block in parallel with said first nozzle and displaced in a direction along the width of said block relative to said first nozzle, said second nozzle having an inlet, an outlet and a constant cross section, further comprising a conduit for supplying shielding gas to said inlet of said second nozzle, said shielding gas exiting said outlet of said second nozzle and diffusing into the weld groove.

21. A system for welding in a very-reduced-width weld groove, comprising:
   a welding torch;
   a welding electrode extending from said welding torch and adapted to fit in the weld groove, said electrode having a tip;
   a first tubular nozzle having an inlet, an outlet and a constant cross section;
   a second tubular nozzle having an inlet, an outlet and a constant cross section;
   means for joining said first tubular nozzle to said second tubular nozzle along a juncture such that said first and second tubular nozzles are mutually parallel;
   filler wire penetrating said first tubular nozzle and extending out of said outlet of said first tubular nozzle to a position below said electrode tip; and
   a conduit for supplying shielding gas to said inlet of said second tubular nozzle, said shielding gas exiting said outlet of said second nozzle and diffusing into the weld groove.

* * * * *